United States Patent [19]

Weber

[11] 4,209,748
[45] Jun. 24, 1980

[54] DIRECTIONAL RADIO SYSTEM FOR SINGLE SIDEBAND OPERATION

[75] Inventor: Herbert Weber, Backnang, Fed. Rep. of Germany

[73] Assignee: Licentia Patent-Verwaltungs G.m.b.H., Frankfurt am Main, Fed. Rep. of Germany

[21] Appl. No.: 883,308

[22] Filed: Mar. 3, 1978

[30] Foreign Application Priority Data

Mar. 3, 1977 [DE] Fed. Rep. of Germany ....... 2709232

[51] Int. Cl.² ................................................ H09B 1/68
[52] U.S. Cl. .......................................... 455/47; 455/71
[58] Field of Search ................... 325/50, 63, 49, 346, 325/329, 419–421; 179/15 BP; 343/100 CS

[56] References Cited

U.S. PATENT DOCUMENTS

| | | | |
|---|---|---|---|
| 2,530,614 | 11/1950 | Hugenholtz | 325/50 |
| 3,068,416 | 12/1962 | Meyer | 325/50 |
| 3,088,070 | 4/1963 | Robel | 325/50 |

FOREIGN PATENT DOCUMENTS

| | | | |
|---|---|---|---|
| 154551 | of 1938 | Austria | 325/49 |
| 480847 | of 1938 | United Kingdom | 325/50 |

Primary Examiner—Robert L. Griffin
Assistant Examiner—Alexander Gerasimow
Attorney, Agent, or Firm—Spencer & Kaye

[57] ABSTRACT

A directional radio system with single sideband operation for the transmission of a carrier frequency modulated single sideband signal in the intermediate frequency plane. In the transmitter, the intermediate frequency signal which contains the base band is provided with at least two pilot signals of different frequency and in the receiver a tuning criterion for the mixing oscillator of the receiver is derived from the frequency spacing of the received pilot signals and from the frequency shift of the received pilot signals produced by transmission of same over the radio links.

6 Claims, 3 Drawing Figures

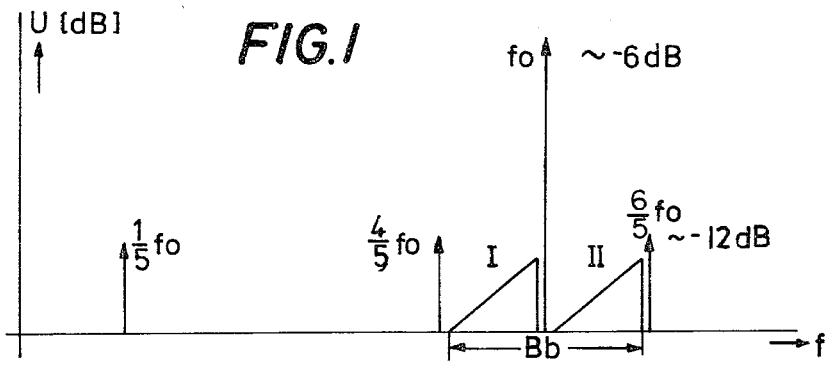
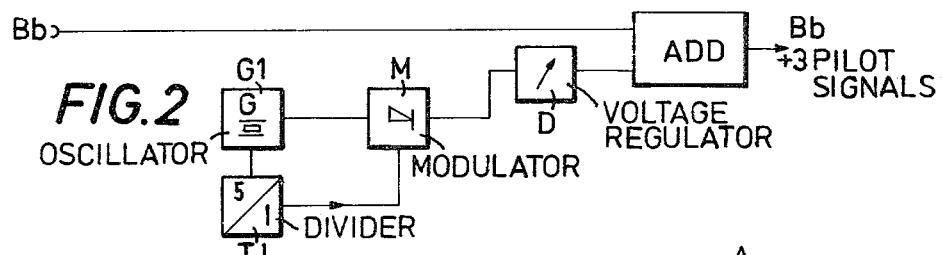
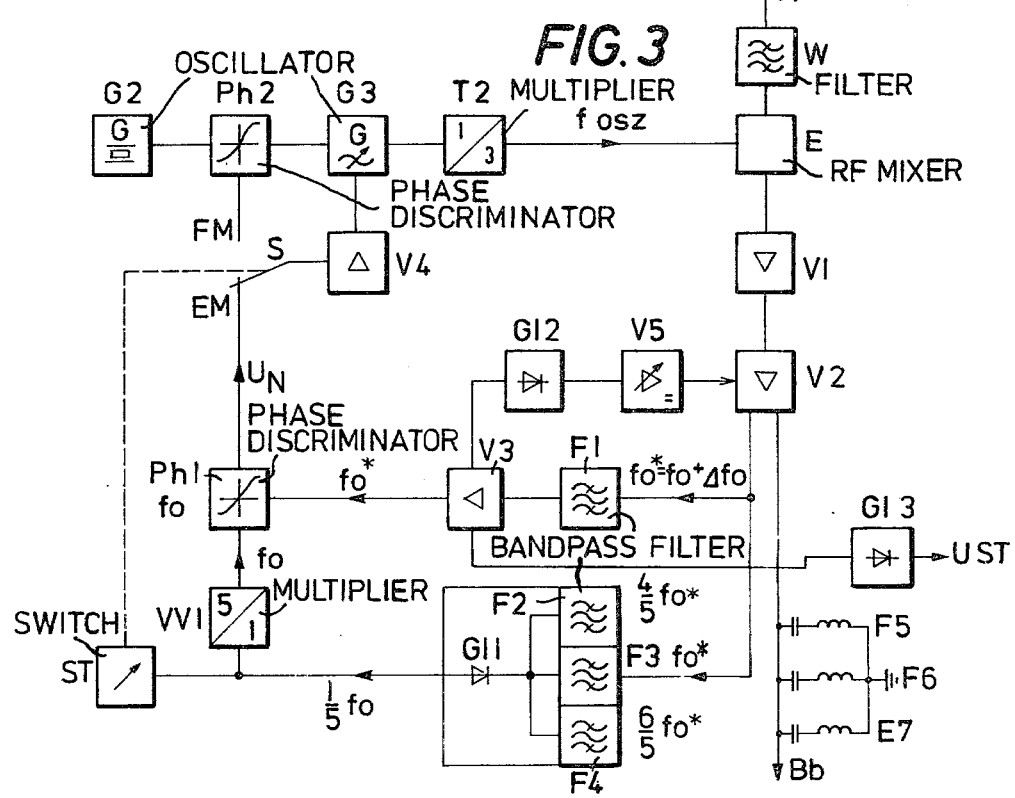

DIRECTIONAL RADIO SYSTEM FOR SINGLE SIDEBAND OPERATION

BACKGROUND OF THE INVENTION

The present invention relates to a directional radio system for the transmission of a single sideband signal modulated with carrier frequency signals in the intermediate frequency band.

The steadily increasing occupation of the available transmission frequency bands and the heavy demand for transmission channels makes it necessary to restrict transmission bandwidth. One method already in use in the carrier frequency transmission art leads to the idea of using the known single sideband operation for transmission in directional radio systems as well.

SUMMARY OF THE INVENTION

It is the object of the present invention to provide a way of using single sideband operation in directional radio systems.

The above object is accomplished by the present invention in that in the radio transmitter the intermediate frequency signal which contains the base band is provided with at least two pilot signals of different frequency and in the receiver a retuning criterion for the mixing oscillator of the receiver is derived from the frequency spacing of the two received pilot signals and from the frequency shift of the received pilot signals produced by the transmission via the radio links.

According to the preferred embodiment of the invention, the pilot signals, which consist of the signals of the fundamental frequency of a quartz oscillator and of at least one frequency resulting from the division of the fundamental frequency of the oscillator by a selectable ratio, are generated in the transmitter and are added to the base band in an addition circuit and via an amplitude control member. At the receiving end, the pilot signals are then separated from the received intermediate frequency signal and one of the received pilot signals is compared in a phase discriminator with a signal having the transmitted pilot frequency derived from the frequency spacing of at least two of the received pilot signals and multiplied with a selected multiplication factor to provide a control voltage corresponding to the phase shift. Finally, the mixing oscillator of the receiver is retuned to its desired frequency by means of the control voltage obtained from the phase comparison.

In this manner, it becomes possible to meet the very high demands placed on such a transmission system. The invention provides compensation for shifts in the transmission frequencies in the radio links in that the oscillator for the receiver is retuned.

BRIEF DESCRIPTION OF THE DRAWINGS

FIG. 1 shows the frequency scheme for the use of three pilot signals according to the invention.

FIG. 2 is a block circuit diagram showing the manner of providing the base band signal at the transmitting end with three pilot signals.

FIG. 3 is a block diagram of one embodiment of the circuit at the receiver for accurately recovering the base band at the receiving end.

DETAILED DESCRIPTION OF THE PREFERRED EMBODIMENTS

FIG. 1 shows the frequency scheme of a directional radio transmission system according to the invention in which three pilot signals are employed. The base band Bb is here divided into two carrier frequency channel groups I and II. These carrier frequency channel groups I and II are identical in size and one pilot signal with the frequency fo lies therebetween. The other two pilot signals, for example, with the frequencies 4/5 fo and 6/5 fo, lie at the upper and lower end, respectively, of the base band Bb. The frequency position is selected so that the three pilot signals are multiples of a frequency of, for example 1/5 fo. This arrangement of frequencies is advisable because this frequency position can be obtained in a simple manner by multiplication, or its arrangement results automatically by modulation of the frequency fo with the frequency 1/5 fo during the modulation process.

The levels of these pilot signals can also be selected as desired. In the illustrated embodiment, the center pilot signal with the frequency fo is assumed to lie $-6$ dB below the channel level of the carrier frequency channels and the other two pilot signals with frequencies 4/5 fo and 6/5 fo are assumed to lie $-12$ dB below the channel level of the carrier frequency channels.

FIG. 2 shows the processing and association of the pilot signals of FIG. 1 with the base band Bb at the transmitting end of the system. A signal with the frequency fo is generated in the quartz oscillator G1 and is fed to a modulator M together with the output signal from a frequency divider $T_1$ which divides the frequency of the signal fo produced by oscillator G1 in the ratio of 5/1. In the modulator M, the signal from divider $T_1$ is modulated on the signal generated in the oscillator G1. This results in the signal at a frequency fo with its two sidebands which lie at the frequencies 4/5 fo and 6/5 fo. In an attenuation member D these three signals are brought to the desired level and are then added, in an addition stage Add, to the base band signal Bb so that the signal available for transmission at the output of the addition stage Add is the base band Bb which has been provided with three pilot signals.

FIG. 3 shows the basic circuit diagram at the receiver for processing the above-described transmission signal employing three pilot signals. The signal received by the antenna A is fed to the RF receiver mixer E through a filter W. This filter W is of no significance for the method of the invention. The RF receiver mixer E receives an oscillator frequency fosz whose frequency must be accurate to within a few Hertz because of the sideband transmission. The intermediate frequency signal which has been derived from the mixing stage E is fed through an intermediate frequency preamplifier V1 to the main intermediate frequency amplifier V2. One output of the main intermediate frequency amplifier V2 is connected with a filter arrangement, including filter F1 and a group of filters, one for each pilot signal depending on the number of pilot signals employed, F2 to F4. These filters F1 to F4 are bandpass filters. The first filter F1 is tuned to the frequency fo of the center pilot signal and in the dimensioning of its bandwidth, a frequency deviation $\Delta f$ from the frequency fo, which deviation is produced by the radio links, must be considered. The received pilot frequency fõ appearing at one output of the amplifier V2 thus is composed of the frequency fo and the frequency deviation $\Delta$fo produced by the radio links.

The other filters F2 to F4 are each tuned to one of the three pilot signals which also include a frequency deviation of $\Delta f$. Based on the fact that the radio links may produce a shift in the entire intermediate frequency band while the mutual spacing between the two pilots remains unchanged, this effect is utilized to tune the oscillator which produces the signal fosz for the mixing stage E to precisely the desired frequency.

After passing through the respective filters F2, F3, F4 the three pilot signals are combined and are demodulated in a demodulaton diode G11 to provide the difference signal of 1/5 fo. This signal at the difference frequency 1/5 fo is multiplied by five, i.e., the inverse of the divider ratio of divider $T_1$ in the illustrated case, in multiplier VVI and fed to a phase discriminator or comparator Ph1. The second signal at frequency fo* to be used for phase comparison is obtained from filter F1 via a further amplifier V3. The phase comparison in the phase discriminator Ph1 compares the two phases of the precise signal fo*, obtained from the mutual spacing of the three pilot signals, with the signal fo* which has been shifted by the radio links so that retuning changes fo* to fo.

The phase discriminator Ph1 produces a control voltage UN from the phase deviation which is used to retune an oscillator G3 which generates the oscillator frequency ⅓ fosz. The output signal of the oscillator G3 is fed to a multiplier T2 which multiplies its input signal by 1:3 to produce the oscillator frequency fosz which produces the pilot frequency fo in the received signal. A series connected preamplifier V4 provides the required level for the control voltage UN.

In order to regulate the main amplifier V2, a signal at frequency fo* is obtained from amplifier V3 and is fed as the control voltage via a rectifier G12, to a regulatable direct current amplifier V5 so as to keep the pilot fo of the main intermediate frequency amplifier V2 at a constant level.

Furthermore, a voltage is branched off from amplifier V3 and is used, after a double rectification in rectifier G13, as a measure for the noise signals. This derived voltage USt serves as an automatic adjustment for the intermodulation noise which is kept at a minimum value.

A further output of the main intermediate frequency amplifier V2 furnishes the base band Bb to which three further filters F5, F6, F7 are connected in parallel. These filters are each tuned to a respective one of the three pilot frequencies and serve to block the pilot frequencies.

In addition to single side band modulation, such a system can also be used as before with simple frequency modulation. Switching to the desired mode of operation can be effected by means of a switch S. The downward illustrated switch position EM switches the system to single sideband modulation and the upward switch position FM switches the system to frequency modulation operation. This switch may also be operated automatically, i.e., with the aid of a control voltage from control device St which derives a control signal by processing of the signal with the frequency 1/5 fo which is subsequently fed to the phase discriminator Ph1.

In the switching position FM of switch S, the quartz generator or oscillator G2 generates a signal which is compared in phase discriminator Ph2 with the frequency of the signal produced by generator G3 and furnishes a retuning voltage via amplifier V4 to retune generator G3.

It is to be understood that although the illustrated embodiment of the invention employs three pilot signals, this is not to be considered as being required. That is, the invention can also be realized with two pilot signals or with more than three pilot signals without there being any difference in transmission quality.

It will be understood that the above description of the present invention is susceptible to various modifications changes, and adaptations, and the ame are intended to be comprehended within the meaning and range of equivalents of the appended claims.

What is claimed is:

1. In a method of using single sideband operation for a directional radio system wherein a single sideband signal, which has been modulated with carrier frequency signals in the intermediate frequency band, is transmitted from a transmitter to a receiver, comprising the steps of: in the transmitter, providing the intermediate frequency signal which contains the base band to be transmitted with at least two pilot signals at difference frequencies; and, in the receiver deriving a control voltage for tuning of the mixing oscillator of the receiver from the frequency spacing of the received pilot signals and from the frequency shift of the pilot signals produced by transmission of same over the radio links; the improvement wherein said step of deriving includes: separating the received pilot signals from the received intermediate frequency signal; combining the pilot signals to produce a further signal whose frequency is the frequency spacing between said pilot signals; multiplying said further signal by a selected multiplication factor to cause the frequency of said further signal to be that of one of said pilot signals; comparing the phase of said one of said pilot signals with the phase of said further signal after said step of multiplying to produce said derived control voltage; and retuning the mixing oscillator of the receiver to its desired frequency with said derived control voltage.

2. The method defined in claim 1 wherein said step of providing includes generating the pilot signals, regulating the amplitude of the pilot signals and adding the regulated pilot signals to the base band in an adder; and wherein said pilot signals consist of a signal of the fundamental frequency of a crystal oscillator and at least one signal obtained by division of said fundamental frequency by a desired ratio.

3. The method defined in claim 2 wherein said one of said pilot signals has said fundamental frequency; said frequency of said further signal is the frequency difference between said fundamental frequency and another of said pilot signals, and said multiplication factor is the inverse of said desired ratio.

4. In a directional radio system with single sideband operation for the transmission of a single sideband signal modulated with a carrier frequency in the intermediate frequency band, said system including a radio transmitter for transmitting the single sideband signal, a radio receiver including a mixer for mixing the received signal with the output signal from a mixing oscillator to provide the intermediate frequency signal, first circuit means in said transmitter for providing the intermediate frequency signal which contains the base band with at least two pilot signals at different frequencies, and second circuit means in said receiver for deriving a tuning criterion for said mixing oscillator from the frequency spacing of said pilot signals and from the frequency shift of the received said pilot signals produced by the transmission of said single sideband signal over the radio links; the improvement wherein said second circuit means includes: a first bandpass filter for separating one of the received pilot signals from the intermediate frequency signal produced by said mixer; a plurality of bandpass filters, one for each pilot signal, for separating each of the respective received pilot signals from the intermediate frequency signal produced by said mixer; circuit means for combining the output signals from each of said plurality of bandpass filters and for demodulating the combined signal to provide a signal whose frequency is equal to the frequency spacing between said pilot signals; frequency multiplier means for multiplying the frequency of the output signal from said circuit means for combining and for demodulation by a selected factor to produce an output signal whose frequency is that of the transmitted pilot signal corresponding to the received pilot signal separated by said first bandpass filter means; a phase comparator having its inputs connected to the output of said first bandpass filter means and the output of said frequency multiplier means, said phase comparator producing a control voltage output signal corresponding to the phase shift between the signals supplied to its two inputs; and circuit means for connecting the output of said phase comparator to the control input of said mixing oscillator to retune said mixing oscillator to correct for said phase shift.

5. The system defined in claim 4 wherein said first circuit means includes: a crystal oscillator; a frequency divider connected to the output of said oscillator for dividing the fundamental output frequency of said oscillator by a desired ratio; a modulator connected to the output of said oscillator and the output of said frequency divider for modulating said fundamental frequency output frequency signal with the output signal from said divider to provide said pilot signals, means connected to the output of said modulator for regulating the amplitude of the pilot signals; and an adder for adding the pilot signals at the output of said means for regulating and the base band signal.

6. The system defined in claim 5 wherein said one of the received pilot signals is said fundamental frequency; and wherein said selected factor of said multiplier is the inverse of said desired ratio.

* * * * *